United States Patent [19]
Andou et al.

[11] Patent Number: 6,137,673
[45] Date of Patent: Oct. 24, 2000

[54] ELECTRIC DOUBLE-LAYAR CAPACITOR

[75] Inventors: Kazuo Andou; Koji Kotani; Takeshi Taguchi; Toshiyuki Matsuoka; Tohru Ohta; Mitsuru Ikeo; Yoshio Yamamoto, all of Wako, Japan

[73] Assignee: Honda Giken Kogyo Kabushiki Kaisha, Tokyo, Japan

[21] Appl. No.: 09/234,487

[22] Filed: Jan. 21, 1999

[30] Foreign Application Priority Data

Jan. 22, 1998 [JP] Japan .................................. 10-010810
Jun. 19, 1998 [JP] Japan .................................. 10-173030
Jun. 24, 1998 [JP] Japan .................................. 10-177424

[51] Int. Cl.[7] .............................. H01G 9/00; H01G 4/228
[52] U.S. Cl. ........................... 361/502; 361/515; 361/520
[58] Field of Search ..................... 361/502, 509, 361/512, 515–516, 520, 517, 519, 535–538, 540; 29/25.03

[56] References Cited

U.S. PATENT DOCUMENTS 3,398,332  8/1968  Logan .
3,439,232  4/1969  Buskirk et al. .
5,381,301  1/1995  Hudis et al. .......................... 361/275.2

*Primary Examiner*—Dean A. Reichard
*Assistant Examiner*—Anthony Dinkins
*Attorney, Agent, or Firm*—Arent Fox Kintner Plotkin & Kahn, PLLC

[57] ABSTRACT

An electric double-layer capacitor includes a plurality of electrode elements each having a current collector, a polarized electrode disposed on a surface thereof, and a strip-like current collecting lead extending from an end of the current collector. The electrode elements are stacked as alternately belonging to respective polarities, and the current collecting leads of the electrode elements are stacked into lead assemblies of the respective polarities. A separator is interposed between the stacked electrode elements, and the lead assemblies are connected respectively to electrode terminals. The lead assemblies of respective polarities serve as respective connectors connected to the electrode terminals. Each of the connectors has a flat joint region as at least a portion thereof. The current collecting leads of each of the lead assemblies are integrally joined to each other by the flat joint region by ultrasonic welding before the connector is connected to the electrode terminal. The connectors are joined to the electrode terminals, respectively, through the respective joint region by electron beam welding or laser beam welding.

8 Claims, 14 Drawing Sheets

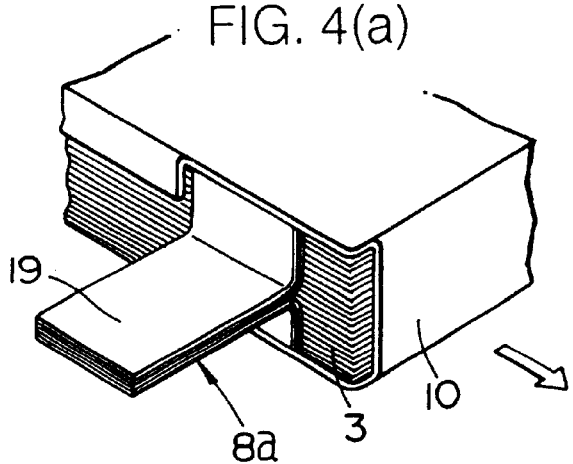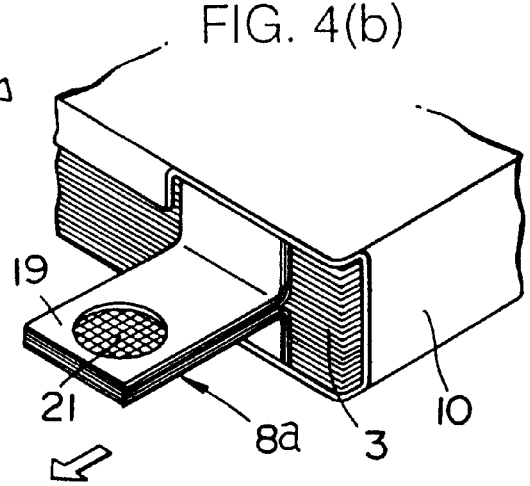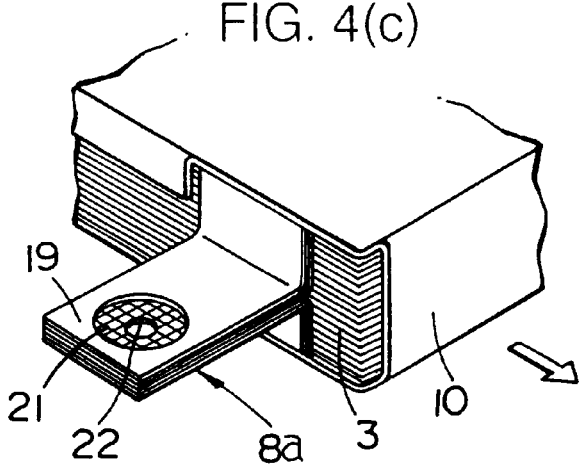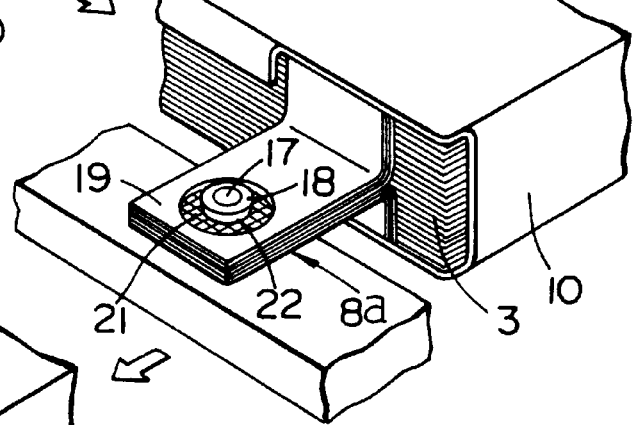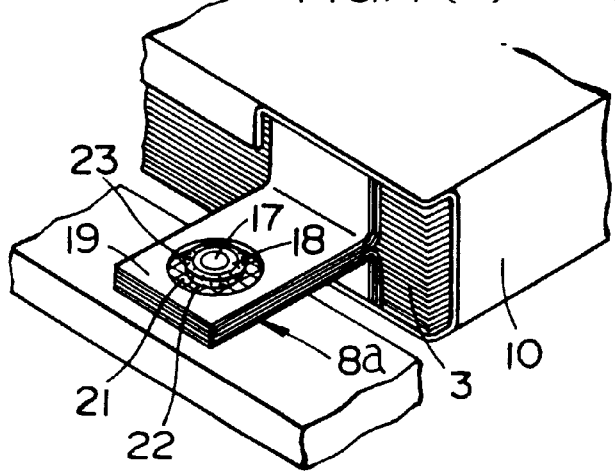

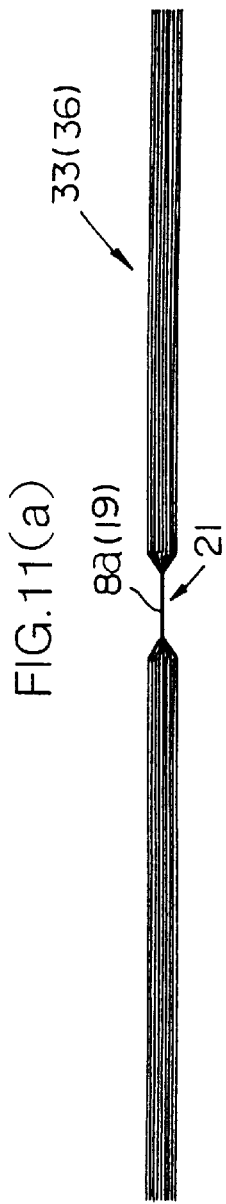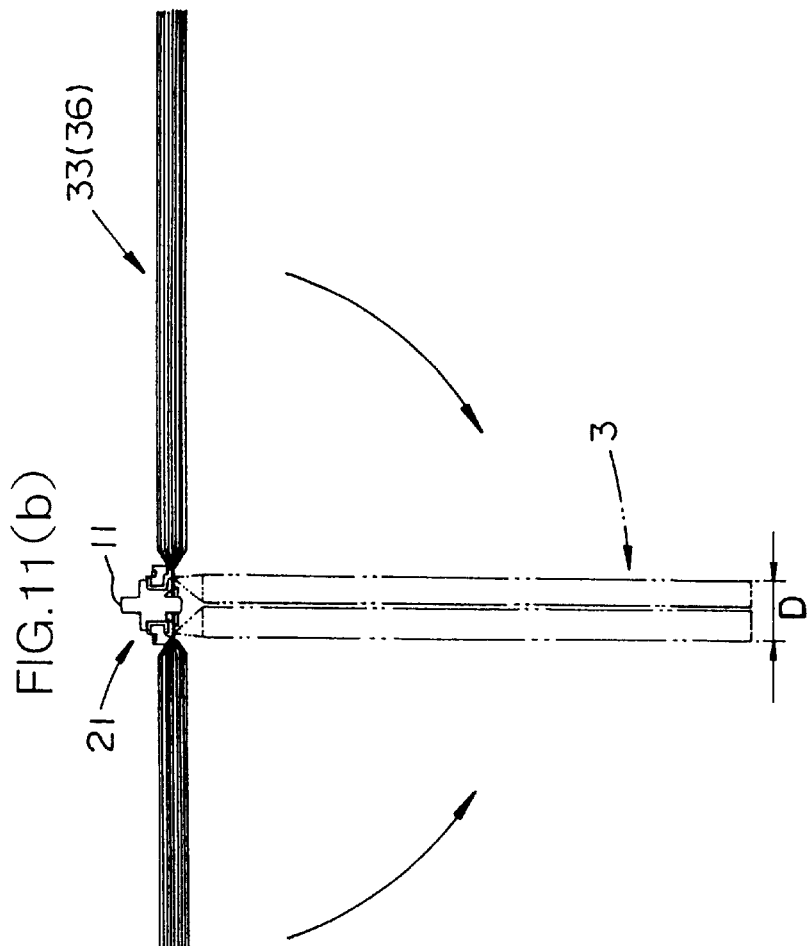

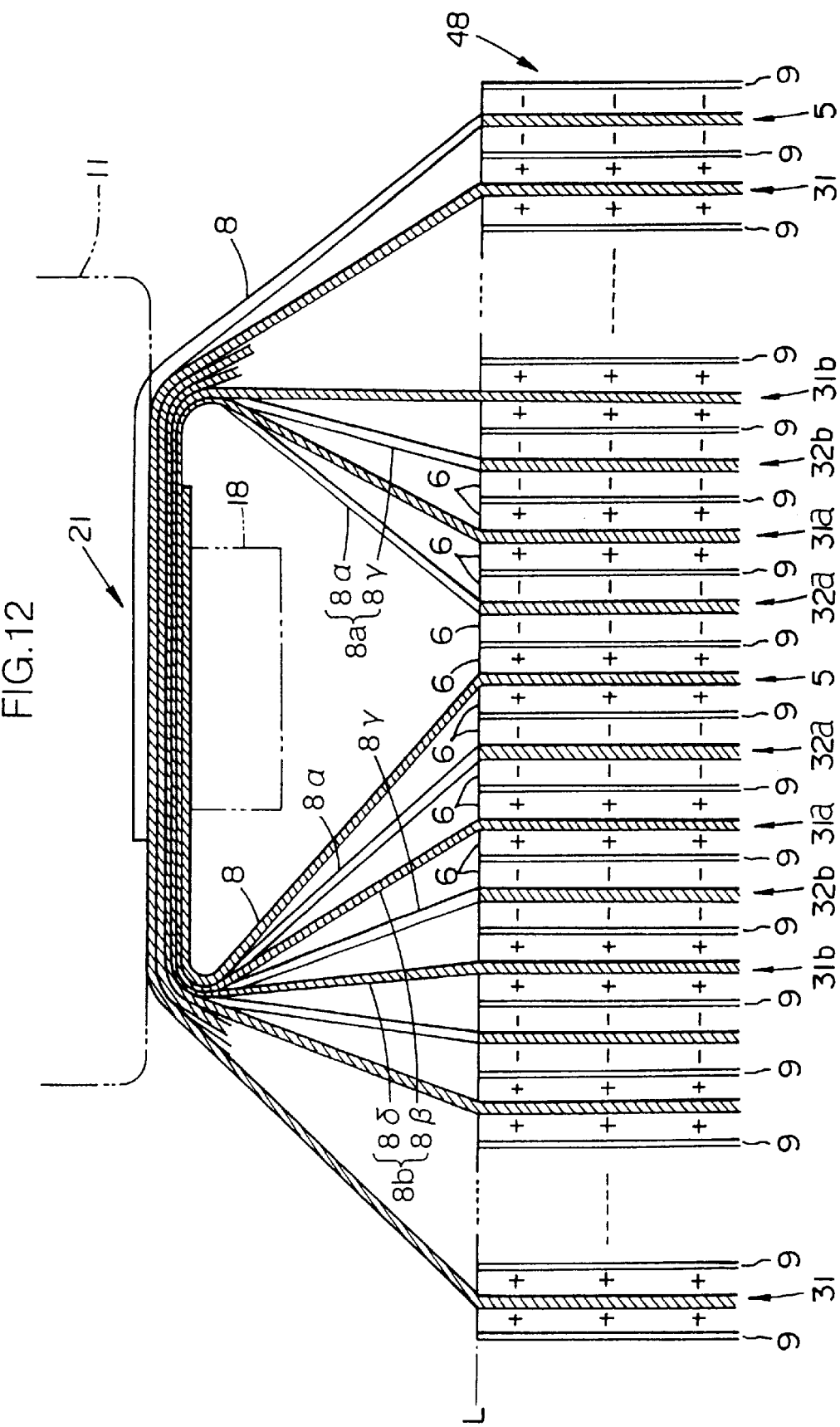

ELECTRIC DOUBLE-LAYAR CAPACITOR

BACKGROUND OF THE INVENTION

1. Field of the Invention

The present invention relates to an electric double-layer capacitor.

2. Description of the Related Art

Generally, a boundary across which two different phases of a solid and a liquid contact each other is associated with an electric double layer which comprises positive and negative electric charges that confront each other across a very small distance therebetween. When an electric field is applied between a pair of polarized electrodes, each made of a solid, which confront each other across a separator that is impregnated with an electrolytic solution, the assembly can be used as an electric double-layer capacitor.

One conventional electric double-layer capacitor has a plurality of electrode elements comprising respective current collectors and polarized electrodes disposed on surfaces of the current collectors, the electrode elements being stacked together with a separator interposed therebetween, forming a stacked assembly. Current collecting leads extending respectively from the current collectors are put together into lead groups of respective polarities, which are connected to respective electrode terminals.

Specifically, the current collecting leads extending respectively from the current collectors are each in the form of a strip of aluminum foil. The current collecting lead of each of the current collectors is displaced toward one side of the face of the polarized electrode which confronts the corresponding electrode terminal. The electrode elements are alternately reversed and stacked together with a separator interposed therebetween, forming a stacked assembly. Adjacent two of the electrode elements have their current collecting leads positioned respectively on different sides thereof. The current collecting leads positioned on the same sides are put together into stacked lead groups of respective polarities, which are connected to the respective electrode terminals.

It has heretofore been known to connect the current collecting leads and the electrode terminals by an ultrasonic welding process. According to the ultrasonic welding process, each stacked electrode group is held against a flat surface of the corresponding electrode terminal, and a pressing member which applies ultrasonic vibrations is pressed against the stacked electrode group in a direction across the current collecting leads to generate fusing heat at the joined surfaces of the current collecting leads and the electrode terminal for thereby joining the current collecting leads altogether to the electrode terminal by way of solid phase diffusion.

If the capacitance of the electric double-layer capacitor is to be increased by increasing the number of polarized electrodes, then the number of current collecting leads is necessarily increased. When the current collecting leads are to be connected altogether to the electrode terminals by ultrasonic welding, however, the ultrasonic energy may not sufficiently be transmitted because of the increased number of current collecting leads. As a result, some of the current collecting leads, particularly those positioned closely to the electrode terminals, i.e., remotely from the pressing member for applying ultrasonic vibrations, tend to be separated, rather than being firmly joined, resulting in an incomplete electric connection between the current collecting leads and the electrode terminals.

Attempts have been made to increase the output power (electric power) of the ultrasonic energy applied in ultrasonic welding as the number of current collecting leads is increased. However, since the current collecting leads and the electrode terminals are made of aluminum, the increased output power tends to produce more oxide film on the adjacent boundary surfaces of the current collecting leads and the electrode terminals. As a consequence, the resistance of the portions of the current collecting leads which are joined to the electrode terminals tend to increase and regions around those portions of the current collecting leads which are joined to the electrode terminals are liable to crack.

The electric double-layer capacitor of the type described above is housed in an outer case and sealed by a lid. The electrode terminals are highly hermetically mounted on the lid before the current collecting leads are connected to the electrode terminals. When the current collecting leads are connected altogether to the electrode terminals by ultrasonic welding with increased output power thereof, the applied ultrasonic vibrations are detrimental to the hermetically sealed connection between the lid and the electric terminals.

SUMMARY OF THE INVENTION

It is therefore an object of the present invention to provide an electric double-layer capacitor which has current collecting leads and electrode terminals that remain electrically connected firmly and reliably even with an increased number of polarized electrodes used for an increased capacitance.

To achieve the above object, there is provided in accordance with an aspect of the present invention an electric double-layer capacitor comprising a plurality of electrode elements each having a current collector, a polarized electrode disposed on a surface thereof, and a strip-like current collecting lead extending from an end of the current collector, the electrode elements being stacked as alternately belonging to respective polarities, the current collecting leads of the electrode elements being stacked into lead assemblies of the respective polarities, a separator interposed between the stacked electrode elements, and a pair of electrode terminals, the lead assemblies being connected respectively to the electrode terminals, the lead assemblies of respective polarities serving as respective connectors connected to the electrode terminals, each of the connectors having a flat joint region as at least a portion thereof, the current collecting leads of each of the lead assemblies being integrally joined to each other by the flat joint region by ultrasonic welding before the connector is connected to the electrode terminal, the connectors being joined to the electrode terminals, respectively, through the respective joint region by electron beam welding or laser beam welding.

Since the lead assemblies of respective polarities serve as respective connectors connected to the electrode terminals, and each of the connectors having a flat joint region as at least a portion thereof, with the current collecting leads of each of the lead assemblies being integrally joined to each other by the flat joint region by ultrasonic welding, the connectors and the electrode terminals can easily be connected by the joint regions.

The connectors are joined to the electrode terminals, respectively, through the respective joint region by electron beam welding or laser beam welding. Because the current collecting leads are integrally joined to each other by the flat joint region by ultrasonic welding, when the joint regions are welded to the electrode terminals, the connectors and the electrode terminals are firmly connected to each other while being well electrically connected to each other. The electron beam welding or laser beam welding allows the joint regions and the electrode terminals to be welded highly accurately even in a relatively small area with a relatively small amount of heat.

Preferably, each of the joint regions has a through hole defined therein, and each of the electrode terminals has a protrusion inserted in the through hole, the through hole having an inner circumferential edge joined to the protrusion by welding. Since the heat produced upon welding is transferred to the joint regions through the protrusions and the inner circumferential edges of the through holes, the heat is prevented from concentrating in local areas, and permits the inner circumferential edges of the through holes to be welded uniformly to the protrusions.

If there is a gap between the inner circumferential edges of the through holes and the radially outer wall surfaces of the protrusions, then air will enter the gap and will be expanded due to the heat produced upon welding, causing metal particles melted by welding to be scattered. If the scattered metal particles are attached to various portions of the electric double-layer capacitor, they will be responsible for an electric short circuit.

To eliminate the above drawback, it is preferable that the protrusion inserted in the through hole have an enlarged portion, and the inner circumferential edge of the through hole be held against the enlarged portion and joined to the protrusion by welding. Since the inner circumferential edge of the through hole is held against the enlarged portion and joined to the protrusion by welding, any gap between the inner circumferential edge of the through hole and the radially outer wall surface of the protrusion is minimized, and hence air in such a gap is prevented from being so expanded as to scatter metal particles.

As described above, the electron beam welding or laser beam welding allows parts to be welded highly accurately even in a relatively small area with a relatively small amount of heat. Therefore, the inner circumferential edge of the through hole can be welded to the protrusion fully along a boundary between a radially outer wall surface of the protrusion and the inner circumferential edge of the through hole. When the inner circumferential edge of the through hole is welded to the protrusion, unnecessary portions thereof are prevented from being melted, and any material loss thereof due to excessive heat is avoided.

According to another aspect of the present invention, there is provided an electric double-layer capacitor comprising a first electrode element comprising a pair of electrodes having respective current collectors, a polarized electrode disposed on a surface of each of the current collectors, and a strip-like current collecting lead extending from the current collectors and interconnecting the electrodes, the electrodes being disposed parallel to each other at respective opposite ends of the current collecting lead, the current collecting lead being displaced toward one side of each of the electrodes, a second electrode element comprising a pair of electrodes having respective current collectors, a polarized electrode disposed on a surface of each of the current collectors, and a strip-like current collecting lead extending from the current collectors and interconnecting the electrodes, the electrodes being disposed parallel to each other at respective opposite ends of the current collecting lead, the current collecting lead being displaced toward one side of each of the electrodes remotely from the current collecting lead of the first electrode element, the first electrode element and the second electrode element being stacked as alternately belonging to respective polarities, the current collecting leads of the first and second electrode elements being stacked into respective lead assemblies of the respective polarities, a separator interposed between the stacked first and second electrode elements, providing a stacked assembly, and a pair of electrode terminals, the lead assemblies being connected respectively to the electrode terminals, the lead assemblies of respective polarities serving as respective connectors connected to the electrode terminals, each of the connectors having a flat joint region as at least a portion thereof, the current collecting leads of each of the lead assemblies being integrally joined to each other by the flat joint region by ultrasonic welding before the connector is connected to the electrode terminal, the connectors being joined to the electrode terminals, respectively, through the respective joint region by electron beam welding or laser beam welding, the stacked assembly being folded on itself about opposite ends of the flat joint region, with the polarized electrodes being superimposed on each other.

In each of the first and second electrode elements, the electrodes are disposed parallel to each other at respective opposite ends of the current collecting lead. Therefore, the capacitance of the polarized electrodes per current collecting lead is twice the corresponding capacitance of the conventional electric double-layer capacitor. Therefore, even through the number of polarized electrodes used is increased to increase the capacitance of the electric double-layer capacitor, the number of current collecting leads used is prevented from increasing. Since the number of current collecting leads used is prevented from increasing, when the current collecting leads of the respective polarities are joined to the electrode terminals by ultrasonic welding, the current collecting leads are prevented from being partly separated, or regions around those portions of the current collecting leads which are joined to the electrode terminals are prevented from cracking. Consequently, the current collecting leads and the electrode terminals are reliably held in good electric connection to each other.

Furthermore, because the stacked assembly is folded on itself about opposite ends of the flat joint region, with the polarized electrodes being superimposed on each other, the electric double-layer capacitor is relatively compact in size. When the stacked assembly is folded on itself as described above, the positional relationship of the electrode terminals and the polarized electrodes is automatically determined. Therefore, it is easy to place the stacked assembly into an outer case.

If all the current collecting leads have the same length when the stacked assembly is folded on itself about the opposite ends of the flat joint region, then the current collecting leads tend to suffer sagging or excessive tension depending on the positional relationship of the electrode elements and the joint regions. If the current collecting leads suffer sagging, the current collectors contiguous to the current collecting leads may be deformed so excessively that the polarized electrodes on the current collectors may crack or be separated and removed, resulting in a reduction in the capacitance of the electric double-layer capacitor or a trouble such as a short circuit. If the current collecting leads suffer excessive tension, then the current collecting leads are liable to crack or the current collectors integral with the current collecting leads are pulled toward the joint regions, resulting in a dislocation of the electrode elements in the stacked assembly.

To avoid the above shortcoming, when the stacked assembly is folded on itself about the opposite ends of the flat joint region, the current collecting lead of the electrode element positioned directly below one of the opposite ends of the joint region is shortest, and the current collecting leads which are positioned progressively outwardly of the stacked assembly away from the one of the opposite ends of the joint region are progressively longer, the current collecting leads having ends connected to the electrode elements and positioned in a flat plane. With this dimensional arrangement, the current collecting leads of the electrode elements are of such lengths that they will neither sag nor be excessively tensioned.

In each of the above aspects of the present invention, the electric double-layer capacitor further comprises a clamp mounted on each of the connectors and clamping the current collecting leads of each of the lead assemblies, the flat joint region being formed through the clamp. The flat joint region can easily be formed by joining the connector, on which the clamp is mounted, by ultrasonic welding.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 4(a) through 4(e) are fragmentary perspective views showing a process of connecting an electrode terminal and current collecting leads to each other;

FIGS. 11(a) and 11(b) are side elevational views showing a process of manufacturing the electric double-layer capacitor according to the second embodiment of the present invention;

FIG. 12 is an enlarged fragmentary view illustrative of the manner in which the electric double-layer capacitor according to the second embodiment of the present invention operates;

DETAILED DESCRIPTION OF THE PREFERRED EMBODIMENTS

Figure 1A:
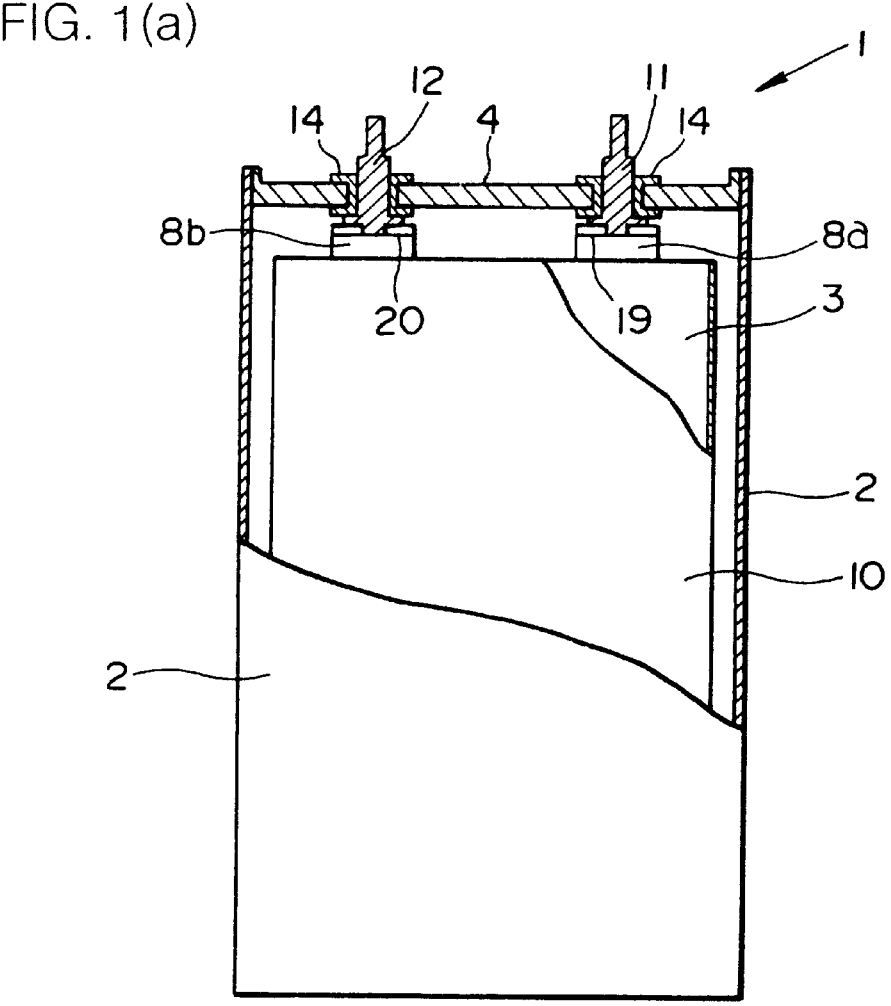
FIG. 1(a) is a side elevational view, partly in cross section, of an electric double-layer capacitor according to a first embodiment of the present invention.

As shown in FIG. 1(a), an electric double-layer capacitor 1 according to a first embodiment of the present invention comprises an outer case 2, a stacked assembly 3 housed in the outer case 2, and a lid 4 which closes the outer case 2. The outer case 2 is in the form of a bottomed hollow quadrangular prism made of aluminum, with the lid 4 fitted in an open end thereof. The outer case 2 houses the stacked assembly 3 and an electrolytic solution.

Figure 2A:
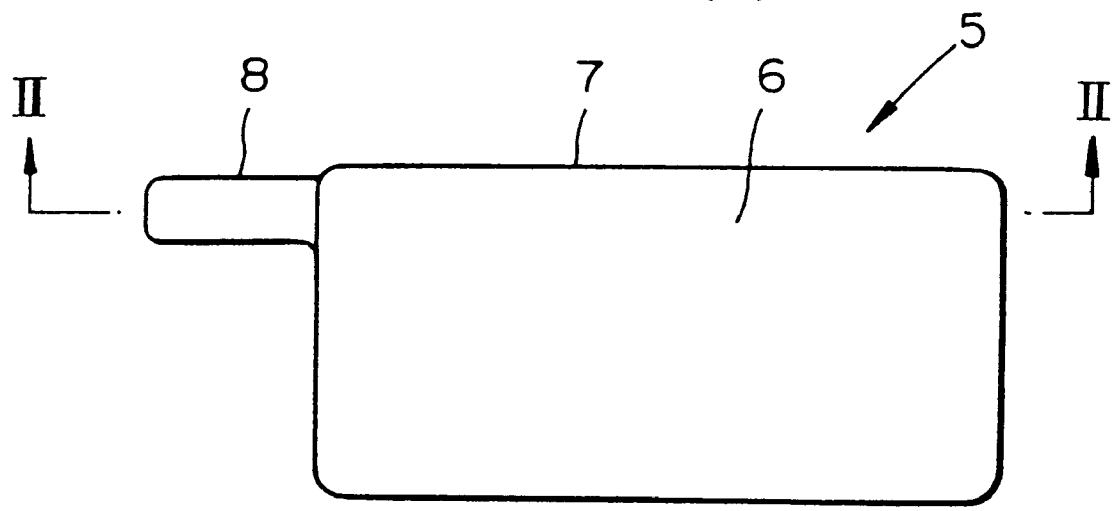
FIG. 2(a) is a plan view of an electrode element in the electric double-layer capacitor according to the first embodiment of the present invention.
Figure 2B:
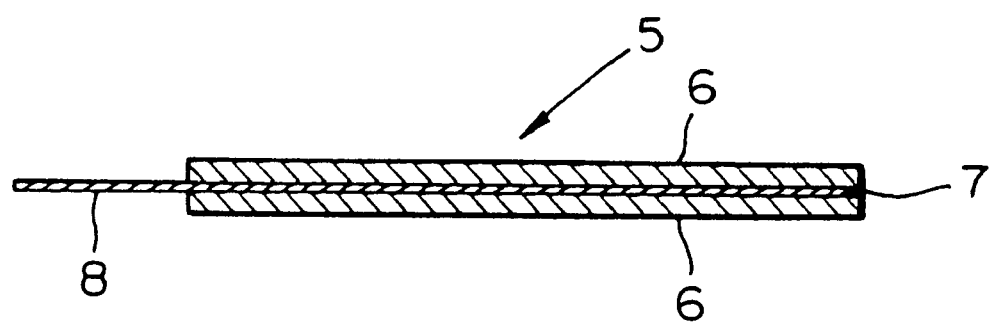
FIG. 2(b) is a cross-sectional view taken along line II—II of FIG. 2(a)
Figure 3:
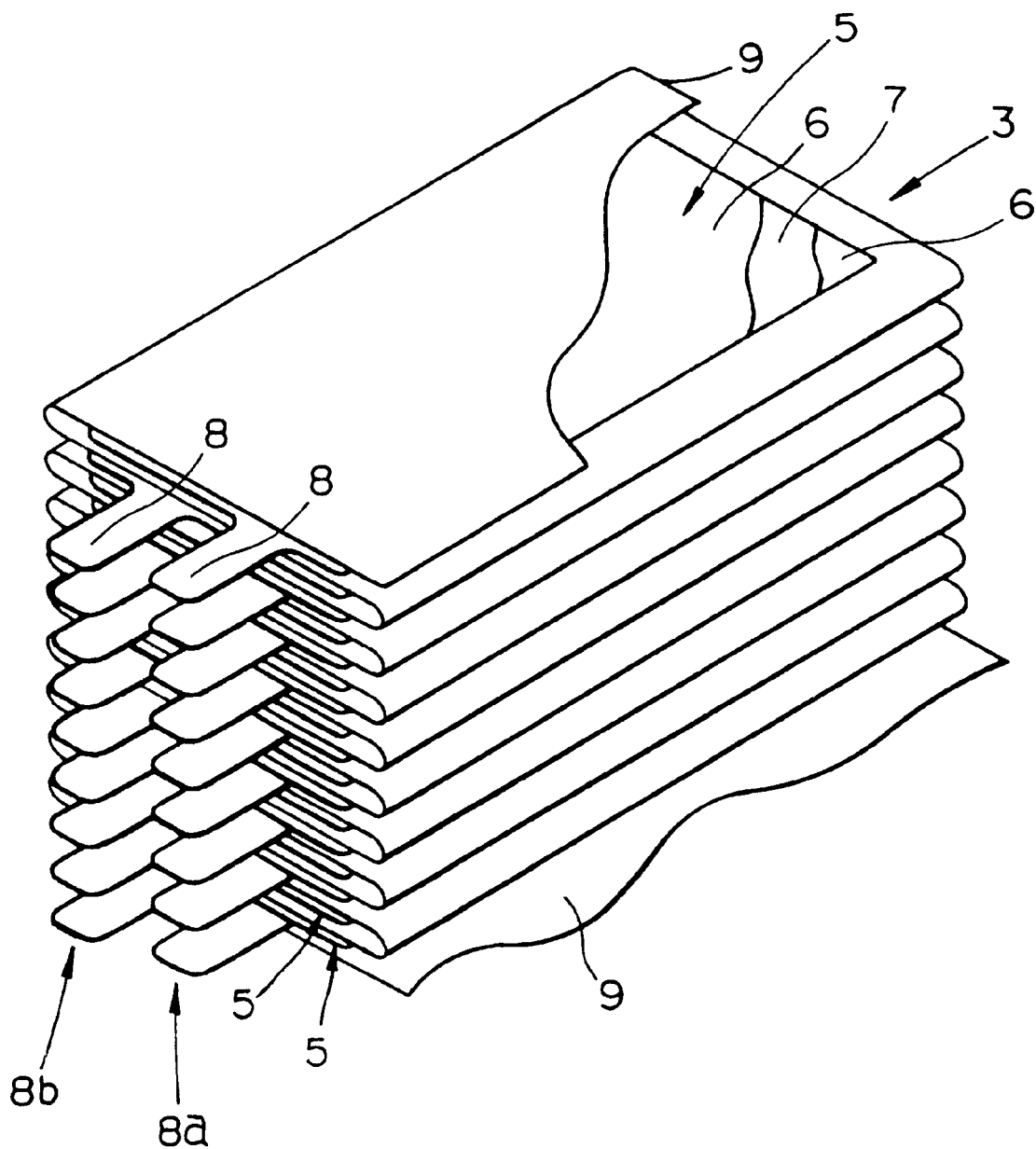
FIG. 3 is a perspective view, partly broken away, of a stacked assembly in the electric double-layer capacitor according to the first embodiment of the present invention.

As shown in FIGS. 2(a) and 2(b), an electrode element 5 comprises a current collector 7 supporting polarized electrodes 6 on opposite surfaces thereof and a strip-like current collecting lead 8 extending from an end of the current collector 7. As shown in FIG. 3, the stacked assembly 3 has a plurality of such electrode elements 5 with a sheet-like separator 9 of insulating material interposed therebetween.

The separator 9 is impregnated with an electrolytic solution of triethylmethyl ammonium tetrafluoroborate/ propylene carbonate or the like. The separator 9 which is impregnated with such an electrolytic solution may comprise a stretched film of fluoroplastics or the like. As shown in FIG. 1(a), the stacked assembly 3 is enclosed by an outer insulating protective shroud 10 to hold the electrode elements 5 and the interposed separator 9 together.

As shown in FIG. 3, the electrode elements 5 are stacked as alternately belonging to respective polarities, or positive and negative electrodes. The current collecting leads 8 of the current collectors 7 of the electrode elements 5 of one polarity extend from one side of the current collectors 7, and the current collecting leads 8 of the current collectors 7 of the electrode elements 5 of the opposite polarity extend from an opposite side of the current collectors 7.

Figure 1B:
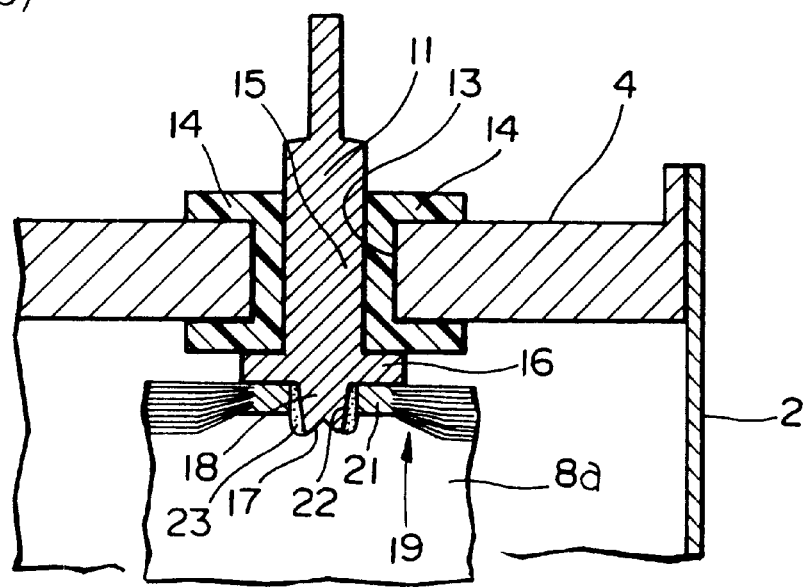
FIG. 1(b) is an enlarged fragmentary cross-sectional view of the electric double-layer capacitor shown in FIG. 1(a)

The lid 4, which is made of aluminum, supports thereon a pair of electrode terminals 11, 12, as shown in FIG. 1(a). The current collecting leads 8 of the current collectors 7 of the electrode elements 5 of one polarity are stacked into a stacked lead assembly 8a which is connected to the electrode terminal 11, whereas the current collecting leads 8 of the current collectors 7 of the electrode elements 5 of the opposite polarity are stacked into a stacked lead assembly 8b which is connected to the electrode terminal 12. The electrode terminals 11, 12 are made of aluminum. As shown in FIG. 1(b) which illustrates the electrode terminal 11, the electrode terminal 11 extends through an insulative sealing member 14 of synthetic resin which is fitted in an insertion hole 13 defined in the lid 4, and is fixed to the lid 4 by the insulative sealing member 14. The stacked lead assembly 8a is welded to an end of the electrode terminal 11 within the case 2.

As shown in FIG. 1(b), the electrode terminal 11 comprises an insert 15 inserted through the insulative sealing member 14 in the insertion hole 13, a radially outwardly projecting flange 16 mounted on a lower end of the insert 15 within the case 2, and a protrusion 18 projecting coaxially downwardly from the insert 15 contiguously to the flange 16 and having a recess 17 defined axially in a lower end of the protrusion 18 and opening downwardly.

As shown in FIG. 1(a), the stacked lead assemblies 8a, 8b serve as respective connectors 19, 20 connected to the respective electrode terminals 11, 12. The stacked lead assembly 8a will be described below with reference to FIG. 1(b). (The connector 19 has a flat joint region 21 by which the current collecting leads 8 are integrally joined together by ultrasonic welding. The current collecting leads 8 each of aluminum foil are united together relatively lightly by the joint region 21.) The joint region 21 has a substantially central through hole 22 defined therein. The through hole 22 is fitted over the protrusion 18, and welded at its inner circumferential edge to the protrusion 18, thereby forming a welded region 23. The current collecting leads 8 are thus electrically connected to the protrusion 18 by the welded region 23. Since the electrode terminal 11 and the stacked lead assembly 8a are fully joined to each other by the welded region 23, the current collecting leads 8 may be united together relatively lightly by the joint region 21 by ultrasonic welding. The electrode terminal 12 and the stacked lead assembly 8b, which are not shown in FIG. 1(b) are also joined to each other in the same manner as with the electrode terminal 11 and the stacked lead assembly 8a.

A process of connecting the electrode terminal 11 and the stacked lead assembly 8a to each other will be described below with reference to FIGS. 4(a)–4(e), 5(a)–5(c), 6(a) and 6(b), and 7(a) and 7(b). While only the electrode terminal 11 and the stacked lead assembly 8a are shown in FIGS. 4(a)–4(e), 5(a)–5(c), 6(a) and 6(b), and 7(a) and 7(b), the same process is employed to connect the electrode terminal 11 and the stacked lead assembly 8a to each other.

Figure 5A:
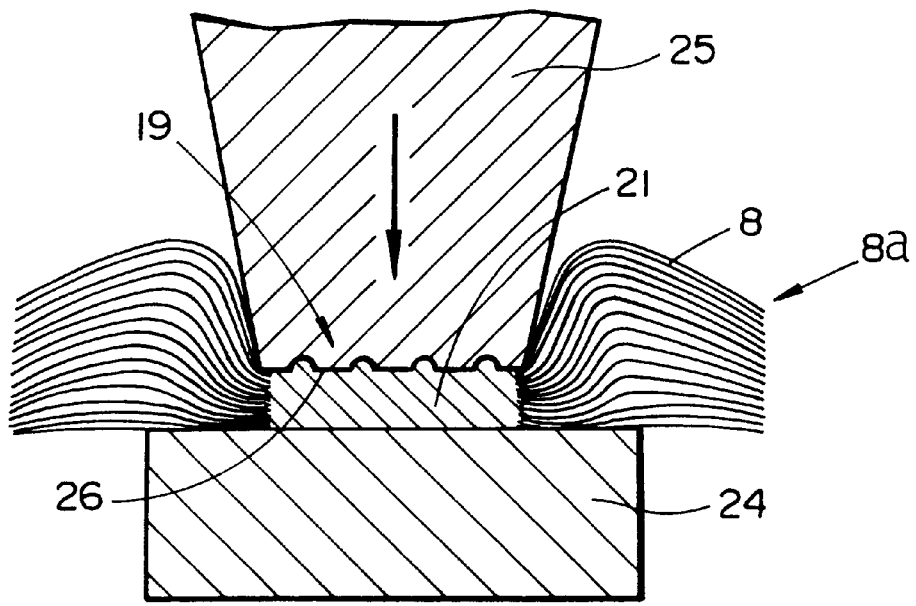
FIGS. 5(a) through 5(c) are enlarged cross-sectional views showing a process of forming a joint region on the current collecting leads by ultrasonic welding.

As shown in FIG. 4(a), the stacked lead assembly 8a composed of the stacked current collecting leads 8 is used as the connector 19. As shown in FIG. 4(b), the joint region 21 is formed in the connector 19. As shown in FIG. 5(a), the joint region 21 is formed by pressing the stacked lead assembly 8a against an anvil 24 with a tip 25 which applies ultrasonic vibration energy. The tip 25 transmits the ultrasonic vibration energy to the current collecting leads 8 and converts the ultrasonic vibration energy into heat energy for thereby joining the boundary surfaces of the current collecting leads 8.

The anvil 24 has a knurled grid pattern on its upper surface for preventing the stacked lead assembly 8a from slipping on the anvil 24. The tip 25 has on its lower distal end a plurality of narrow teeth 26 for deforming oxide films that are produced on the surfaces of the aluminum foil strips of the current collecting leads 8 when they are joined by ultrasonic welding. The teeth 26 are defined by a grid pattern of grooves in the lower distal end of the tip 25, and project downwardly. When the teeth 26 compress the current collecting leads 8, the tip 25 partly breaks the oxide films to expose clean surfaces of the current collecting leads 8, which are then joined together by the exposed clean surfaces.

As described above, the current collecting leads 8 are not required to be fully united together, but may be joined relatively lightly, by ultrasonic welding. Therefore, the tip 25 may only need to apply relatively small compressive forces and a relatively small output power of ultrasonic energy. The current collecting leads 8 are prevented from cracking due to a large deformation of the joined region 21 which would otherwise be caused if the current collecting leads 8 were fully united together by ultrasonic welding.

Figure 5B:
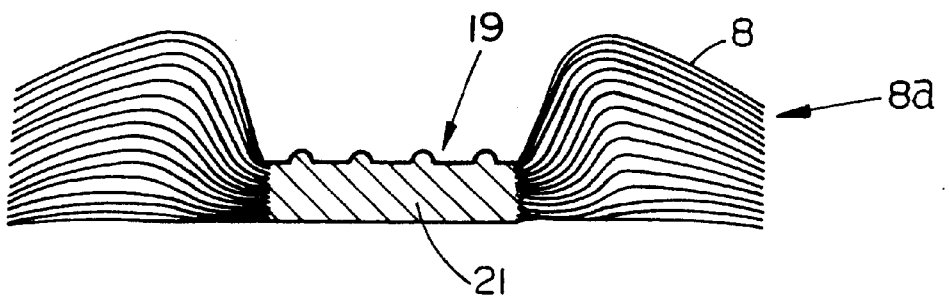
Figure 5C:
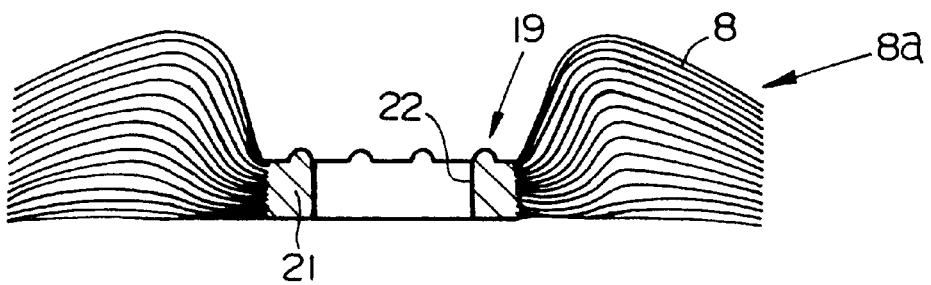
Figure 6A:
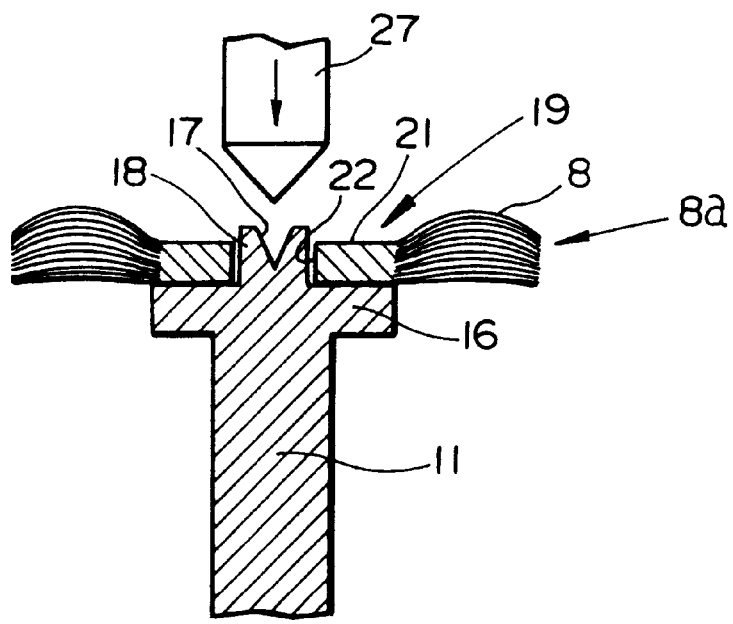
FIGS. 6(a) and 6(b) are enlarged cross-sectional views showing a process of enlarging a protrusion of an electrode terminal in the process of connecting the electrode terminal and current collecting leads to each other.
Figure 6B:
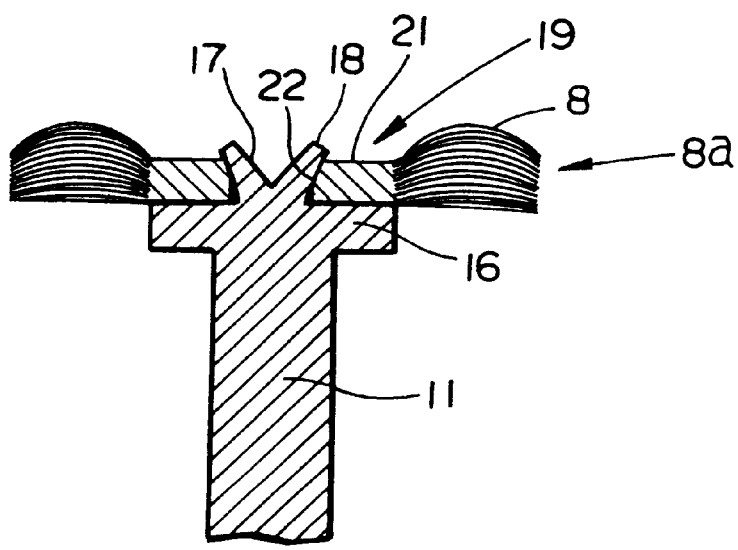

Then, as shown in FIGS. 4(c) and 5(c), a through hole 22 is defined centrally in the joint region 21 by a piercing machine or the like. Thereafter, as shown in FIG. 4(d), the protrusion 18 of the electrode terminal 11 is inserted into the through hole 22. If an inner circumferential edge of the through hole 22 is burred on one side thereof when the through hole 22 is formed, then the protrusion 18 is inserted into the through hole 22 with the flange 16 held against a burr-free side of the inner circumferential edge of the through hole 22, so that the flange 16 will not abut against the burrs and hence will not create a gap between the flange 16 and the joint region 21. Thereafter, as shown in FIG. 6(a), the distal end of the protrusion 18 is hit by a punch 27 so as to be enlarged radially outwardly or increased in diameter. Since the recess 17 has been formed in the distal end of the protrusion 18, the distal end of the protrusion 18 can easily be enlarged when the recess 17 is spread radially outwardly by the punch 27. When the distal end of the protrusion 18 is enlarged radially outwardly, the outer circumferential wall of the protrusion 18 is brought into intimate contact with the inner circumferential edge of the through hole 22, as shown in FIG. 6(b).

Figure 7A:
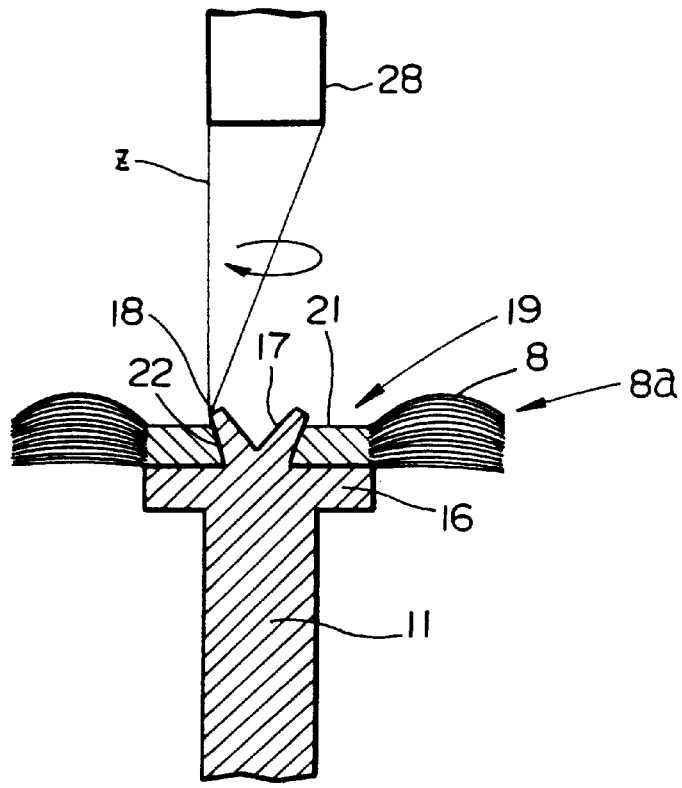
FIGS. 7(a) and 7(b) are enlarged cross-sectional views showing a process of welding an electrode terminal and current collecting leads to each other.
Figure 7B:
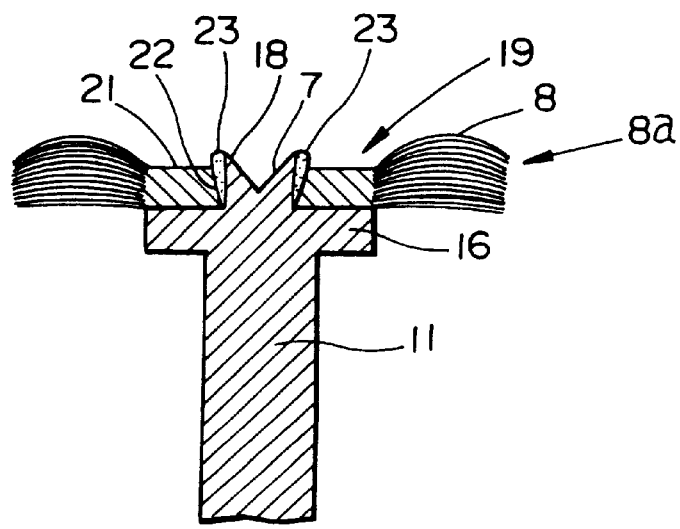

Then, as shown in FIG. 4(e), the protrusion 18 and the joint region 21 are welded to each other. Specifically, as shown in FIG. 7(a), the protrusion 18 and the joint region 21 are welded to each other by an electron beam welding process in which an electron beam z radiated from a welding apparatus 28 is applied to the entire boundary between the radially outer wall surface of the protrusion 18 and the inner edge of the through hole 22 in the joint region 21. In this embodiment, the electron beam z is applied to an outer circumferential area of the protrusion 18 which is slightly spaced radially inwardly from the boundary between the protrusion 18 and the edge of the through hole 22, along the full outer circumferential edge of the protrusion 18. In this manner, the outer circumferential edge of the protrusion 18 is sufficiently melted and joined to the joint region 21 at a welded region 23.

At this time, since the current collecting leads 8 in the form of aluminum foil strips are integrally joined to each other by the joint region 21, the current collecting leads 8 will not be separated from each other. Furthermore, because the distal end of the protrusion 18 is enlarged radially outwardly, any gap between the protrusion 18 and the inner circumferential edge of the through hole 22 is extremely small, and air in such gap is not appreciably expanded by the heat generated when the protrusion 18 and the joint region 21 are welded to each other. Accordingly, aluminum particles are not scattered when the protrusion 18 and the joint region 21 are welded to each other. The stacked lead assembly 8a and the electrode terminal 11 are not directly joined to each other by ultrasonic welding, but the joint region 21 by which the current collecting leads 8 are integrally joined together by ultrasonic welding is welded to the electrode terminal 11. Therefore, the electrode terminal 11 and the stacked lead assembly 8a are firmly connected to each other and at the same time remain well electrically connected to each other.

Though the protrusion 18 and the joint region 21 are welded to each other by the electron beam welding process employing the electron beam z in this embodiment, the protrusion 18 and the joint region 21 can also accurately be welded into the welded region 23 by a laser beam welding process.

An electric double-layer capacitor according to a second embodiment of the present invention will be described below.

Figure 8A:
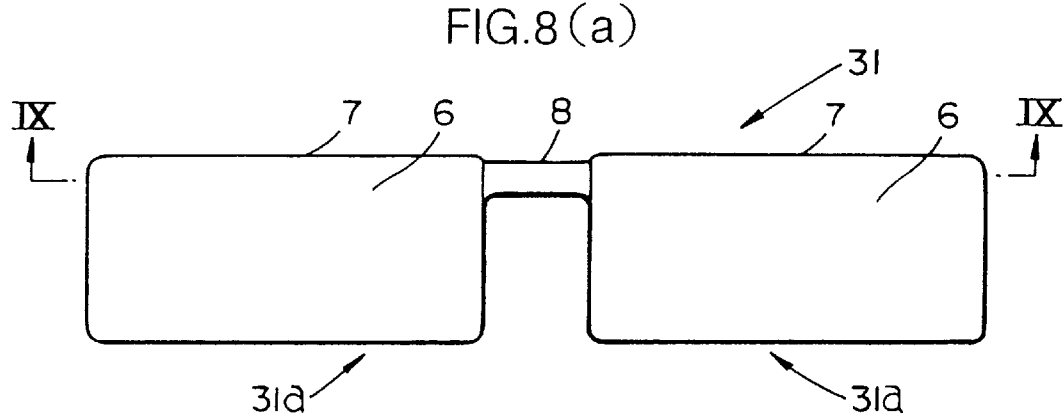
FIGS. 8(a) and 8(b) are plan views of electrode elements in an electric double-layer capacitor according to a second embodiment of the present invention.
Figure 9:
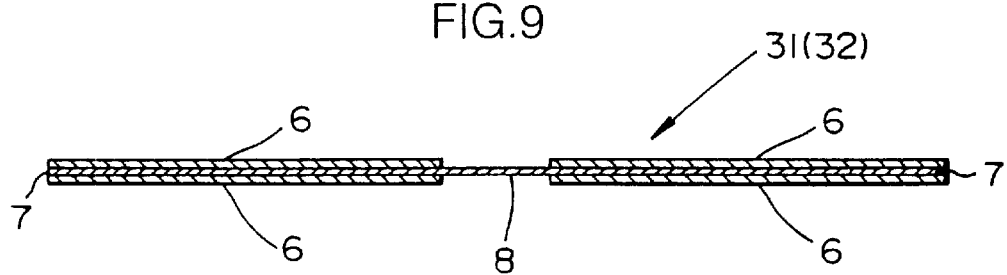
FIG. 9 is a cross-sectional view taken along line IX—IX of FIGS. 8(a) and 8(b)

As shown in FIGS. 8(a) and 9, the electric double-layer capacitor according to the second embodiment of the present invention includes a plurality of first electrode elements 31. Each of the first electrode elements 31 comprises a pair of electrodes 31a each comprising a current collector 7 supporting polarized electrodes 6 on opposite surfaces thereof and a strip-like current collecting lead 8 extending from confronting ends of the current collectors 7 of the electrodes 31a and interconnecting the electrodes 31a. The electrodes 31a are disposed parallel to each other at the respective opposite ends of the current collecting lead 8. The electrodes 31a, each having an elongate rectangular shape, are juxtaposed with their shorter sides facing each other, and the current-collecting lead 8 is displaced toward respective longer sides of the electrodes 31a. The current collectors 7 and the current collecting lead 8 are integrally formed of aluminum foil or the like.

Figure 8B:
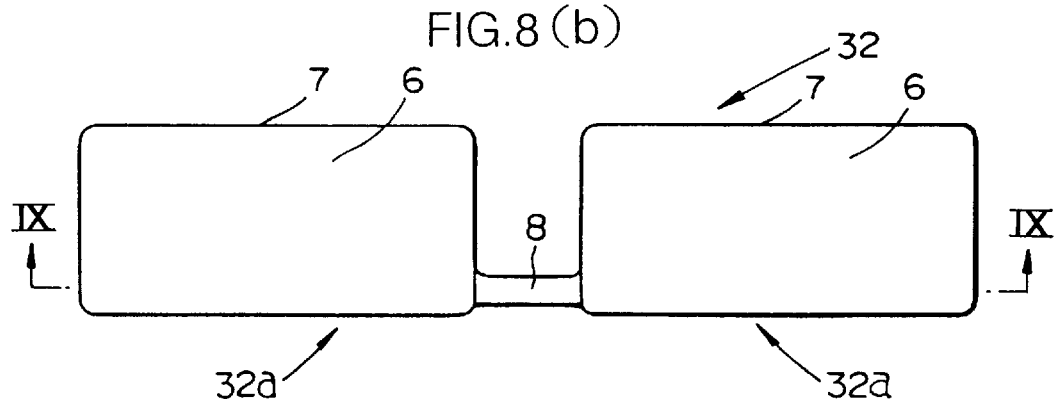

As shown in FIGS. 8(b) and 9, the electric double-layer capacitor according to the second embodiment of the present invention also includes a plurality of second electrode elements 32. The second electrode elements 32 are of the same structure as the first electrode elements 31 except that each of the second electrode elements 32 has a pair of electrodes 32a disposed parallel to each other at respective opposite ends of a current collecting lead 8, and the current collecting lead 8 is displaced toward respective longer sides of the electrodes 32a which are opposite to the longer sides of the electrodes 31a that are close to the current collecting lead 8, i.e., displaced away from the current collecting lead 8 of the first electrode element 31. Since each of the first and second electrode elements 31, 32 has polarized electrodes 6 disposed on respective opposite surfaces of the current collectors 7, the first electrode element 31 may be used as the second electrode element 32 when reversed, or turned upside down, to change the current collecting lead 8 from the position shown in FIG. 8(a) to the position shown in FIG. 8(b), and the second electrode element 32 may be used as the first electrode element 31 when reversed to change the current collecting lead 8 from the position shown in FIG. 8(b) to the position shown in FIG. 8(a).

Figure 10:
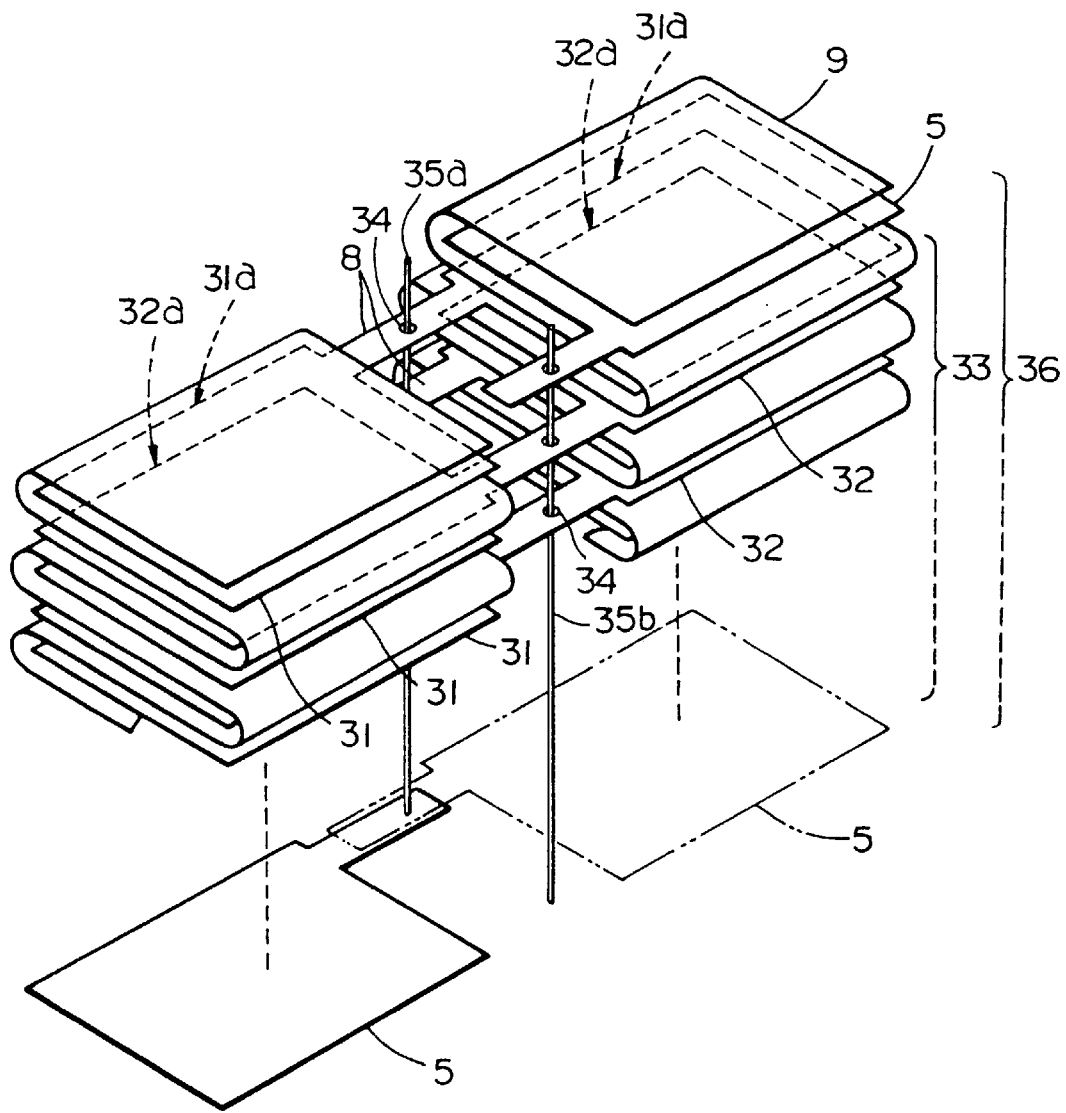
FIG. 10 is a perspective view, partly broken away, of a stacked assembly in the electric double-layer capacitor according to the second embodiment of the present invention.

As shown in FIG. 10, the first and second electrode elements 31, 32 are alternately stacked with a sheet-like separator 9 of insulating material interposed between the polarized electrodes 6, thus producing a first stacked assembly 33. The separator 9 is impregnated with an electrolytic solution. The current collecting leads 8 of the first and second electrode elements 31, 32 have positioning holes 34 defined therein. Therefore, the first and second electrode elements 31, 32 can easily be stacked in proper positional alignment with each other by positioning pins 35a, 35b inserted through the positioning holes 34.

In the first stacked assembly 33, the current collecting leads 8 of the first electrode elements 31 of one polarity are superimposed, and the current collecting leads 8 of the second electrode elements 32 of the opposite polarity are superimposed. Therefore, the current collecting leads 8 of the electrode elements 5 as one electrode are stacked into a stacked lead assembly 8a, and the current collecting leads 8 of the electrode elements 5 as the other electrode are stacked into another stacked lead assembly 8b.

As shown in FIG. 11(a), the stacked lead assembly 8a (8b) is used as a connector 19 (20), and a joint region 21 is formed in the connector 19 (20). When an electrode terminal 11 (12) is connected to the joint region 21, as shown in FIG. 11(b), the entire assembly may be used as an electric double-layer capacitor. However, since the electrode elements 31, 32 alternately stacked with the separator 9 interposed between the polarized electrodes 6 extend flatwise from the opposite sides of the connector 19 (20), the electric double-layer capacitor is relatively large in size. Therefore, it is desirable to make the electric double-layer capacitor more compact.

One possible approach to make the electric double-layer capacitor more compact would be to fold the first stacked assembly 33 on itself about opposite ends of the joint region 21 to which the electrode terminals 11, 12 are joined, bringing the electrode elements 31, 32 into superimposed relation to each other, as indicated by the imaginary lines in FIG. 11(b).

However, if the first stacked assembly 33 is folded on itself about the electrode terminals 11, 12, the electrodes of one electrode element, e.g., the electrodes 32a of the electrode element 32, confront each other across the separator 9 in the innermost layer of the folded structure, so that the polarized electrodes 6 of the electrodes 32a will be charged to one polarity. Therefore, the polarized electrodes 6 which confront each other across the separator 9 in the innermost layer will not develop an electric double layer, and will not contribute to the formation of a capacitance.

According to the second embodiment, as shown in FIG. 10, an electrode element 5, which is identical to the electrode element 5 shown in FIG. 2, is placed over one of the electrodes 31a as an outermost face-side layer (uppermost layer in FIG. 10) of the first stacked assembly 33 with the separator 9 interposed therebetween, and another electrode element 5, which is identical to the electrode element 5 shown in FIG. 2, is placed over one of the electrodes 32a as an outermost reverse-side layer (lowermost layer in FIG. 10) of the first stacked assembly 33 with the separator 9 interposed therebetween, thus making up a second stacked assembly 36. Since the electrode elements 5 thus added have polarities unlike those of the electrode elements 31, 32 which are adjacent to the added electrode elements 5 across the separator 9, the electrode element 5 which is positioned adjacent to the electrode element 31 across the separator 9 has its current collecting lead 8 positioned on the same side as the current collecting leads 8 of the electrode elements 32, and the electrode element 5 which is positioned adjacent to the electrode element 32 across the separator 9 has its current collecting lead 8 positioned on the same side as the current collecting leads 8 of the electrode elements 31.

In the first stacked assembly 33 shown in FIG. 10, the number of stacked electrode elements 31 is the same as the number of stacked electrode elements 32. Therefore, the first electrode elements 31 are positioned as the uppermost layer of the first stacked assembly 33, and the second electrode elements 32 are positioned as the lowermost layer of the first stacked assembly 33. As a consequence, the electrode element 5 whose current collecting lead 8 is positioned on the same side as the current collecting leads 8 of the second electrode elements 32 is placed over the uppermost layer of the first stacked assembly 33, and the electrode element 5 whose current collecting lead 8 is positioned on the same side as the current collecting leads 8 of the first electrode elements 31 is placed over the lowermost layer of the first stacked assembly 33.

In FIG. 10, the electrode element 5 placed over the uppermost layer of the first stacked assembly 33 is disposed on one of the polarized electrodes 6 of the uppermost layer, and the electrode element 5 placed over the lowermost layer of the first stacked assembly 33 is disposed on one of the polarized electrodes 6 of the lowermost layer out of alignment with, i.e., remotely from, the electrode element 5 placed over the uppermost layer of the first stacked assembly 33. However, insofar as the current collecting leads 8 of the electrode elements 5 are positioned as described above, the electrode elements 5 may be placed respectively over the uppermost and lowermost layers of the first stacked assembly 33 in alignment with each other, as indicated by the imaginary lines in FIG. 10.

In FIG. 2, the electrode element 5 has its polarized electrodes 6 disposed on respective opposite surfaces of the current collector 7. However, in the arrangement shown in FIG. 10, the electrode element 5 does not need to have two polarized electrodes 6 disposed on respective opposite surfaces of the current collector 7, but may have only one polarized electrode 6 disposed on at least a surface of the current collector 7 which faces the first stacked assembly 33.

Then, a joint region 21 is formed in the connector 19 (20) of the second stacked assembly 36, in the same manner as with the electric double-layer capacitor according to the first embodiment, and an electrode terminal 11 (12) is welded to the joint region 21 by electron beam welding or laser beam welding, as shown in FIG. 11(b). The second stacked assembly 36 is then folded on itself about opposite ends of the joint region 21, producing a stacked assembly 3, as indicated by the imaginary lines in FIG. 11(b). The stacked assembly 3 will be used to manufacture an electric double-layer capacitor, as with the stacked assembly 3 in the first embodiment.

In order to prevent the current collecting leads 8 from cracking under excessive tension or from contacting each other to produce a short circuit due to excessive sagging, the current collecting leads 8 have a length which is 1.5 to 2.5 times the thickness D (see FIG. 11(b)) of the superimposed structure composed of the electrode elements 31, 32, 5 and the separator 9 interposed therebetween.

Structural details of the electric double-layer capacitor according to the second embodiment of the present invention are shown in FIG. 12.

As shown in FIG. 12, the stacked assembly 3 comprises an electrode element 5 as an innermost layer, a pair of electrodes 32a of a second electrode element 32 disposed one on each side of the electrode element 5, a pair of electrodes 31a of a first electrode element 31 disposed one on each side of the second electrode element 32, alternate pairs of electrodes 32b, 31b of second and first electrode elements 32, 31 which are arranged successively outwardly, and an electrode element 5 disposed on one side of the outermost layer.

The electrode elements 31, 32, 5 have confronting polarized electrodes 6 with the separator 9 interposed therebetween. The paired electrodes 32a, the paired electrodes 31a, the paired electrodes 32b, the paired electrodes 31b, and so on are connected to each other by respective current collecting leads 8α, 8β, 8γ, 8δ, and so on. The current collecting leads of electrode elements of one polarity are grouped into a stacked lead assembly 8a serving as a connector 19, and a joint region 21 is formed in the connector 19 and connected to an electrode terminal 1. Specifically, the current collecting leads 8β, 8δ, and so on (shown in cross section in FIG. 12) of the electrodes 31a, 31b, and so on, and the current collecting leads 8α, 8γ, and so on of the electrodes 32a, 32b, and so on are grouped into stacked lead assemblies 8a, 8b, which are connected respectively to electrode terminals 11, 12. The electrode terminal 12 is concealed from view behind the electrode terminal 11 in FIG. 12. The electrode element 5 in the innermost layer and the electrode element 5 in the outermost layer have no paired counterparts. The current collecting lead 8 of the electrode element 5 in the innermost layer is combined with the current collecting leads 8β, 8δ, and the current collecting lead 8 of the electrode element 5 in the outermost layer is combined with the current collecting leads 8α, 8γ.

The current collecting leads 8α, 8β, 8γ, 8δ, and so on are dimensioned such that the current collecting lead 8δ closest to an end of the joint region 21 is shortest, and the current collecting leads 8γ, 8β, 8α that are progressively farther from the end of the joint region 21 inwardly into the stacked assembly 3 from the current collecting lead 8δ are progressively longer in the named order. The current collecting leads positioned outwardly from the current collecting lead 8δ are progressively longer in a direction away from the end of the joint region 21. As a result, the electrode elements 31, 32, 5 of the stacked assembly 3 are prevented from being dislocated from their stacked position, and the ends of the current collecting leads 8 which are connected to the electrode elements 31, 32, 5 remain in a flat plane L.

The electric double-layer capacitor operates as follows: Electric energy is supplied from an external power supply to the electrode terminals 11, 12 to apply a voltage between the electrode terminals 11, 12 so that the electrode element 5 in the innermost layer and the electrode elements 31 which will act as a positive electrode and the electrode element 5 in the outermost layer and the electrode elements 32 as a negative electrode. The polarized electrodes 6 of the electrode elements 31, 32, 5 which confront each other across the separator 9 are now charged to the respective polarities. When a discharging external circuit is connected to the electrode terminals 11, 12, the stored electric charge is supplied from the electric double-layer capacitor to the discharging external circuit.

In each of the above embodiments, the joint region 21 is formed in each of the connectors 19, 20 by ultrasonic welding. However, a clamp may be mounted on each of the connectors 19, 20, and a joint region 21 may be formed on the clamp by ultrasonic welding.

Figure 13A:
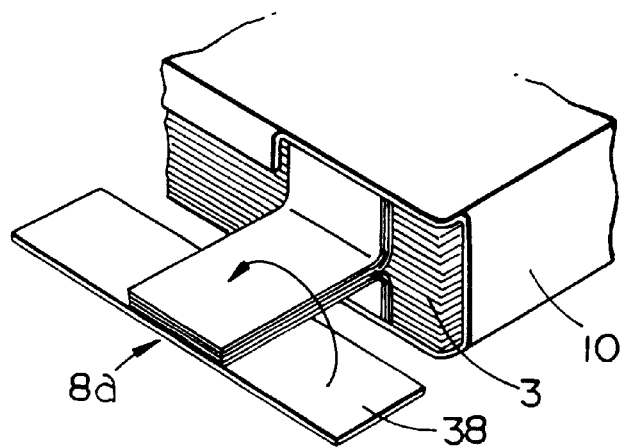
FIGS. 13(a) through 13(c) and 14(a) through 14(c) are fragmentary perspective views showing pretreatment processes prior to processes of forming a joint region in the electric double-layer capacitors according to the first and second embodiments of the present invention operates.
Figure 13B:
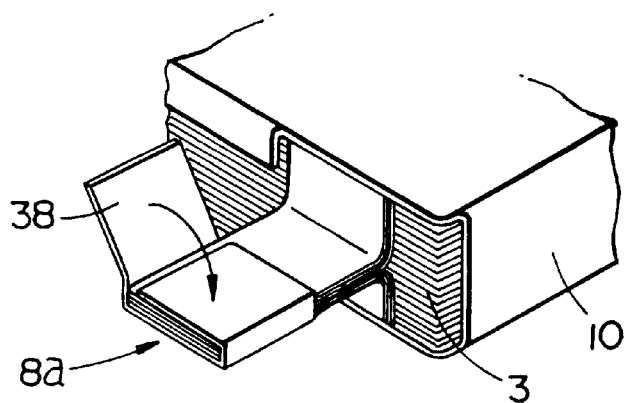
Figure 13C:
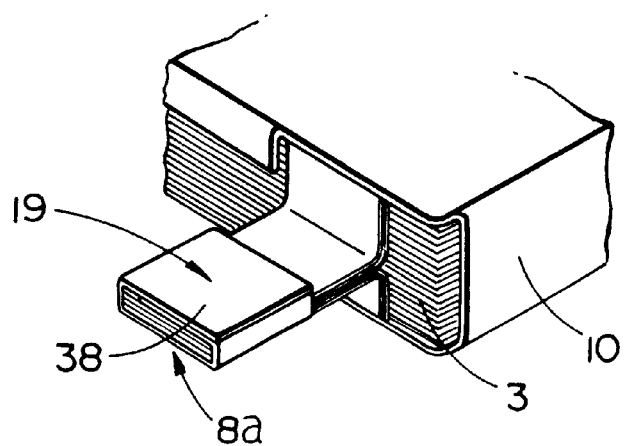

According to the first embodiment, such a clamp comprises a strap ribbon 38 of aluminum as shown in FIGS. 13(a) through 13(c). The strap ribbon 38 is wound around the current collecting leads 8 of the stacked lead assembly 8a (8b) serving as the connector 19 (20).

Figure 14A:
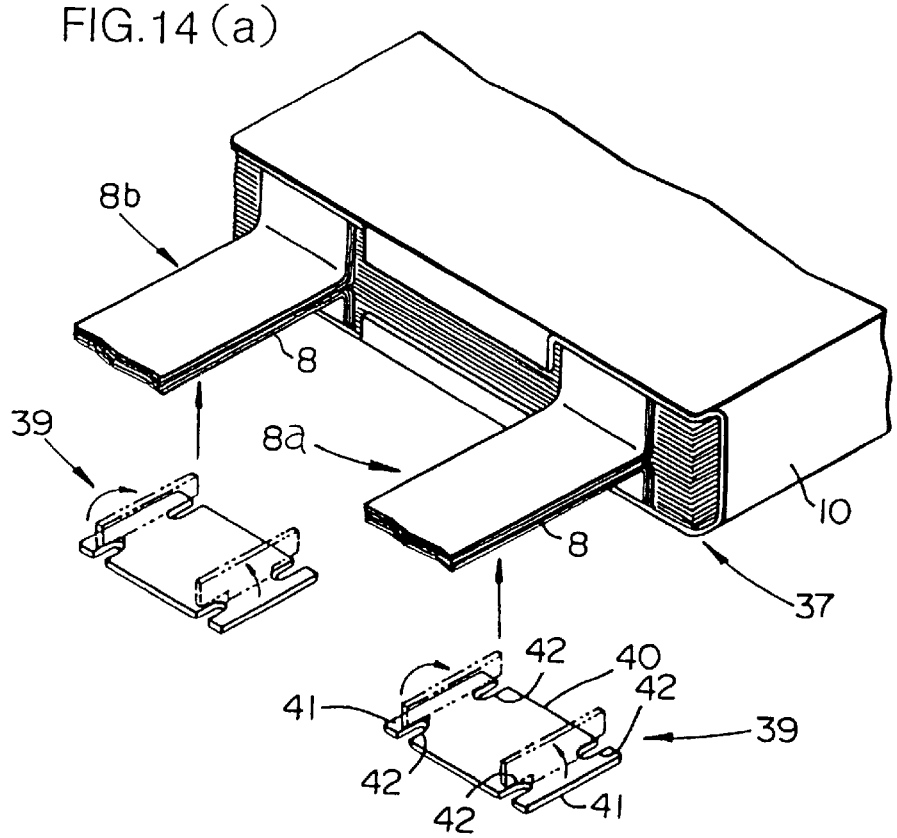
Figure 14B:
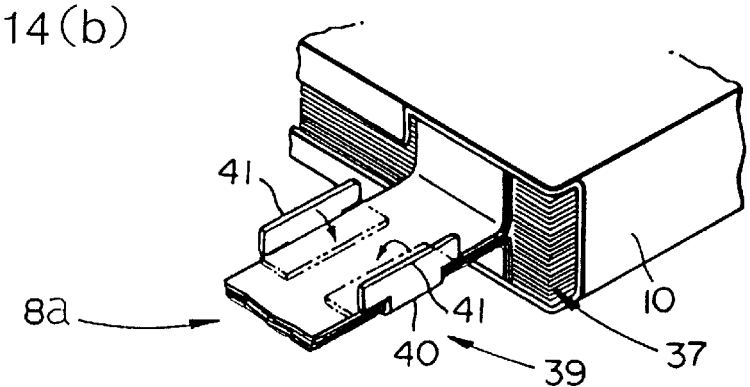
Figure 14C:
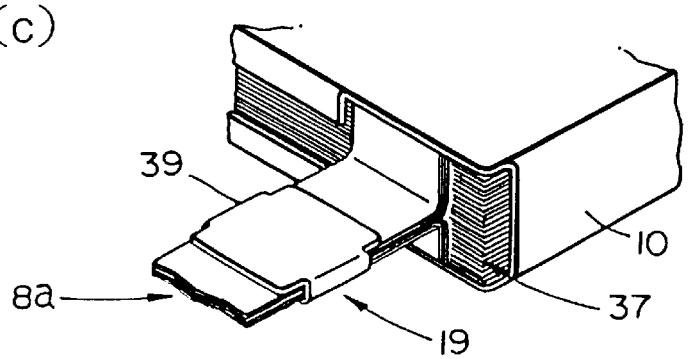

According to the second embodiment, such a clamp comprises a protective cover 39 of aluminum as shown in FIGS. 14(a) through 14(c). The protective clamp 39 comprises a cover body 40 having the same width as the current collecting leads 8 and a pair of tongues 41 joined to lateral edges, respectively, of the cover body 40. The protective cover 39 has slits 42 defined longitudinally in opposite ends between the cover body 40 and the tongues 41. Each of the slits 42 has a length smaller than half the length of the protective cover 39.

As indicated by the imaginary lines in FIG. 14(a), the tongues 41 of the protective cover 39 are bent through a right angle along the slits 42. Then, as shown in FIG. 14(b), the stacked lead assembly 8a is placed on the cover body 40 between the tongues 41. The tongues 41 are thereafter bent over and held against the stacked lead assembly 8a, as indicated by the imaginary lines in FIG. 14(b), so that the protective cover 39 is mounted on the connector 19. The stacked lead assembly 8a with the protective cover 39 mounted on the connector 19 is illustrated in a reversed state in FIG. 14(c).

Thereafter, the current collecting leads 8 are joined to the connector 19 (20) through the strap ribbon 38 or the protective cover 39 by ultrasonic welding according to a process which is the same as the process shown in FIGS. 5(a) through 5(c), forming a joint region 21. Then, a through hole 22 is formed in the joint region 21, the protrusion 18 of the electrode terminal 11 (12) is inserted into the through hole 22, and then joined to the joint region 21 by an electron beam welding process or a laser beam welding process, according to a process which is the same as the process shown in FIGS. 4(a)–4(e), 5(a)–5(c), 6(a) and 6(b), and 7(a) and 7(b)

The strap ribbon 38 may be employed in the second embodiment, and the protective cover 39 may be employed in the first embodiment. However, the protective cover 39 is preferable for use in the second embodiment because the protective cover 39 protects the current collecting leads 8 when a stacked assembly 37 is folded on itself about opposite ends of the joint region 21.

Figure 15A:
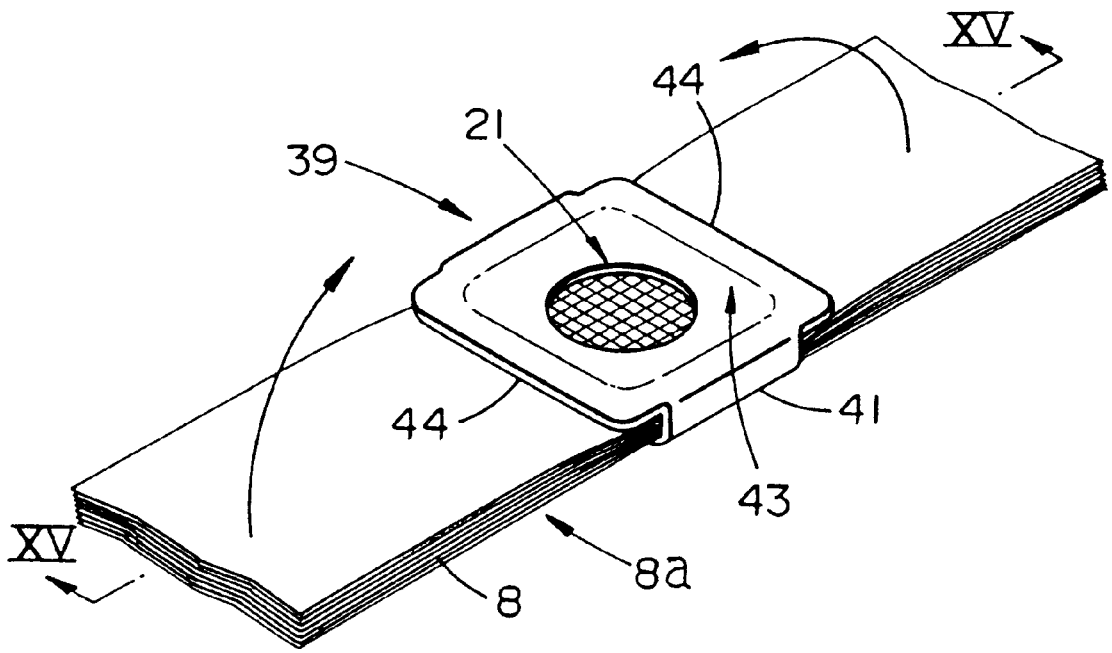
FIG. 15(a) is a perspective view of a joint region which is formed using a clamp shown in FIGS. 14(a) through 14(c)
Figure 15B:
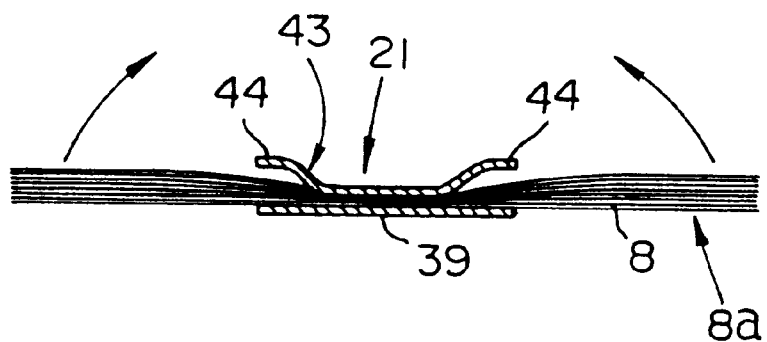
FIG. 15(b) is a cross-sectional view taken along line XV—XV of FIG. 15(a).

An action of the protective cover 39 to protect the current collecting leads 8 will be described in detail below with reference to FIGS. 15(a) and 15(b). When a tip (not shown) which imparts ultrasonic vibrations is pressed against the protective cover 39, the joint region 21 is formed on the protective cover 39, as shown in FIG. 15(a). At this time, as shown in FIG. 15(b), a raised clearance web 43 complementary in shape to the tip which imparts ultrasonic vibrations is formed around the joint region 21. When the stack assembly 38 is folded on itself, the stacked lead assembly 8a is bent along the raised clearance web 43. At this time, the current collecting leads 8 are guided by the raised clearance web 43 for protection against damage.

The raised clearance web 43 has an outer circumferential edge 44 which is melted into a beveled or rounded shape by the heat produced when the current collecting leads 8 are joined to the protective cover 39 by ultrasonic welding. Therefore, when the stacked lead assembly 8a is bent along the raised clearance web 43, the current collecting leads 8 are brought into contact with the beveled or rounded outer circumferential edge 44, and hence protected against damage.

Although certain preferred embodiments of the present invention have been shown and described in detail, it should be understood that various changes and modifications may be made therein without departing from the scope of the appended claims.

What is claimed is:

1. An electric double-layer capacitor comprising:
   a plurality of electrode elements each having a current collector, a polarized electrode disposed on a surface thereof, and a strip-like current collecting lead extending from an end of said current collector, said electrode elements being stacked as alternately belonging to respective polarities, said current collecting leads of the electrode elements being stacked into lead assemblies of the respective polarities;
   a separator interposed between the stacked electrode elements; and
   a pair of electrode terminals, said lead assemblies being connected respectively to said electrode terminals;
   said lead assemblies of respective polarities serving as respective connectors connected to said electrode terminals;
   each of said connectors having a flat joint region as at least a portion thereof, said current collecting leads of each of said lead assemblies being integrally joined to each other by said flat joint region by ultrasonic welding before the connector is connected to said electrode terminal, said connectors being joined to said electrode terminals, respectively, through the respective joint region by electron beam welding or laser beam welding.

2. An electric double-layer capacitor according to claim 1, wherein each of said joint regions has a through hole defined therein, each of said electrode terminals having a protrusion inserted in said through hole, said through hole having an inner circumferential edge joined to said protrusion by welding.

3. An electric double-layer capacitor according to claim 2, wherein said protrusion inserted in said through hole has an enlarged portion, said inner circumferential edge of said through hole being held against said enlarged portion and joined to said protrusion by welding.

4. An electric double-layer capacitor according to claim 3, wherein said inner circumferential edge of said through hole is welded to said protrusion fully along a boundary between a radially outer wall surface of said protrusion and the inner circumferential edge of said through hole.

5. An electric double-layer capacitor according to claim 1, further comprising a clamp mounted on each of said connectors and clamping the current collecting leads of each of said lead assemblies, said flat joint region being formed through said clamp.

6. An electric double-layer capacitor comprising:
   a first electrode element comprising a pair of electrodes having respective current collectors, a polarized electrode disposed on a surface of each of said current collectors, and a strip-like current collecting lead extending from said current collectors and interconnecting said electrodes, said electrodes being disposed parallel to each other at respective opposite ends of said current collecting lead, said current collecting lead being displaced toward one side of each of said electrodes;
   a second electrode element comprising a pair of electrodes having respective current collectors, a polarized electrode disposed on a surface of each of said current collectors, and a strip-like current collecting lead extending from said current collectors and interconnecting said electrodes, said electrodes being disposed parallel to each other at respective opposite ends of said current collecting lead, said current collecting lead being displaced toward one side of each of said electrodes remotely from the current collecting lead of said first electrode element;
   said first electrode element and said second electrode element being stacked as alternately belonging to respective polarities;
   said current collecting leads of the first and second electrode elements being stacked into respective lead assemblies of the respective polarities;
   a separator interposed between the stacked first and second electrode elements, providing a stacked assembly; and
   a pair of electrode terminals, said lead assemblies being connected respectively to said electrode terminals;
   said lead assemblies of respective polarities serving as respective connectors connected to said electrode terminals;
   each of said connectors having a flat joint region as at least a portion thereof, said current collecting leads of each of said lead assemblies being integrally joined to each other by said flat joint region by ultrasonic welding before the connector is connected to said electrode terminal, said connectors being joined to said electrode terminals, respectively, through the respective joint region by electron beam welding or laser beam welding;

said stacked assembly being folded about opposite ends of said flat joint region, with the polarized electrodes being superimposed on each other.

7. An electric double-layer capacitor according to claim 6, wherein when the stacked assembly is folded about the opposite ends of said flat joint region, the current collecting lead of the electrode element positioned directly below one of the opposite ends of the joint region is shortest, and the current collecting leads which are positioned progressively outwardly of the stacked assembly away from said one of the opposite ends of the joint region are progressively longer, said current collecting leads having ends connected to the electrode elements and positioned in a flat plane.

8. An electric double-layer capacitor according to claim 7, further comprising a clamp mounted on each of said connectors and clamping the current collecting leads of each of said lead assemblies, said flat joint region being formed through said clamp.

* * * * *